(12) United States Patent
Dembski et al.

(10) Patent No.: US 11,530,977 B2
(45) Date of Patent: Dec. 20, 2022

(54) PARTICLE SORTING MODULE WITH ALIGNMENT WINDOW, SYSTEMS AND METHODS OF USE THEREOF

(71) Applicant: Becton, Dickinson and Company, Franklin Lakes, NJ (US)

(72) Inventors: Kyle Dembski, Scotts Valley, CA (US); Henry Lankila, Livermore, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 81 days.

(21) Appl. No.: 17/316,502

(22) Filed: May 10, 2021

(65) Prior Publication Data
US 2021/0262916 A1    Aug. 26, 2021

Related U.S. Application Data

(62) Division of application No. 16/526,769, filed on Jul. 30, 2019, now Pat. No. 11,035,776.
(Continued)

(51) Int. Cl.
*G01N 15/14* (2006.01)

(52) U.S. Cl.
CPC ....... *G01N 15/1459* (2013.01); *G01N 15/147* (2013.01); *G01N 15/1425* (2013.01);
(Continued)

(58) Field of Classification Search
CPC ........... G01N 15/1434; G01N 15/1425; G01N 15/1459; G01N 15/147; G01N 2015/1481; G01N 2015/149
See application file for complete search history.

(56) References Cited

U.S. PATENT DOCUMENTS

| 3,826,364 A | 7/1974 | Bonner et al. |
| D339,194 S | 9/1993 | Telang |

(Continued)

FOREIGN PATENT DOCUMENTS

| EP | 0672458 A2 | 9/1995 |
| JP | 4-500008 A | 1/1992 |

(Continued)

OTHER PUBLICATIONS

Jayasinghe et al. "Sterile and Disposable Fluidic Subsystem Suitable for Clinical High Speed Fluorescence-Activated Cell Sorting", Cytometry Part B (Clinical Cytometry) 708:344-354 (2006).
(Continued)

*Primary Examiner* — Michael P LaPage
(74) *Attorney, Agent, or Firm* — Bret E. Field; Bozicevic, Field & Francis LLP

(57) ABSTRACT

Aspects of the present disclosure include a particle sorting module having an opening that is configured for visualizing droplets of a deflected flow stream. Particle sorting modules according to certain embodiments include a housing having a proximal end, a distal end and a wall therebetween having an opening positioned in the wall that is configured for aligning the flow stream with one or more sample containers at the distal end. Systems and methods for aligning a flow stream with one or more sample containers and sorting particles of a sample (e.g., a biological sample) are also provided. Kits having one or more of the particle sorting modules suitable for coupling with a particle sorting system and for practicing the subject methods are also described.

12 Claims, 2 Drawing Sheets

Related U.S. Application Data

(60) Provisional application No. 62/752,793, filed on Oct. 30, 2018.

(52) U.S. Cl.
CPC ... *G01N 15/1434* (2013.01); *G01N 2015/149* (2013.01); *G01N 2015/1481* (2013.01)

(56) References Cited

U.S. PATENT DOCUMENTS

| | | | |
|---|---|---|---|
| 6,079,836 | A | 6/2000 | Burr et al. |
| 6,248,590 | B1 | 6/2001 | Malachowski |
| D676,567 | S | 2/2013 | Van Den Engh |
| 8,455,258 | B2 | 6/2013 | Quake et al. |
| 8,727,132 | B2 | 5/2014 | Miltenyi et al. |
| 8,795,500 | B2 | 8/2014 | Shinoda |
| D715,925 | S | 10/2014 | Suzuki |
| D717,438 | S | 11/2014 | Lin |
| D802,150 | S | 11/2017 | Lund |
| 9,964,968 | B2 | 5/2018 | Sharpe et al. |
| 2004/0025602 | A1 | 2/2004 | Norton |
| 2004/0062685 | A1 | 4/2004 | Norton |
| 2004/0142463 | A1 | 7/2004 | Walker et al. |
| 2005/0011582 | A1 | 1/2005 | Haug |
| 2005/0112541 | A1 | 5/2005 | Durack et al. |
| 2011/0020855 | A1 | 1/2011 | Shinoda et al. |
| 2011/0134426 | A1 | 6/2011 | Kaduchak et al. |
| 2011/0137018 | A1 | 6/2011 | Chabg-Yen et al. |
| 2011/0217722 | A1 | 9/2011 | Durack et al. |
| 2011/0217723 | A1 | 9/2011 | Durack |
| 2011/0275052 | A1 | 9/2011 | Durack et al. |
| 2011/0271746 | A1 | 11/2011 | Shinoda |
| 2011/0284378 | A1 | 11/2011 | Shinoda |
| 2012/0164718 | A1 | 6/2012 | Bishop et al. |
| 2012/0276621 | A1 | 11/2012 | Van Den Engh |
| 2013/0330739 | A1 | 12/2013 | Yu |
| 2014/0078502 | A1 | 3/2014 | Buchanan et al. |
| 2014/0120570 | A1 | 5/2014 | Yu et al. |
| 2014/0170697 | A1 | 6/2014 | Sharpe et al. |
| 2014/0309795 | A1 | 10/2014 | Norton et al. |
| 2015/0330385 | A1 | 11/2015 | Lofstrom et al. |
| 2015/0346075 | A1* | 12/2015 | Andreev ............ G01N 15/1404 356/440 |
| 2016/0041082 | A1 | 2/2016 | Van Den Engh |
| 2017/0299493 | A1 | 10/2017 | Norton |
| 2017/0307502 | A1* | 10/2017 | Mason ................. B01J 19/0046 |

FOREIGN PATENT DOCUMENTS

| | | | |
|---|---|---|---|
| JP | 2000-516345 A | 12/2000 | |
| JP | 2013210270 | 10/2013 | |
| WO | WO 90/04019 A1 | 4/1990 | |
| WO | WO 99/26067 A1 | 5/1999 | |
| WO | WO 2010/033140 A2 | 3/2010 | |
| WO | WO-2014152039 A2 * | 9/2014 | ......... G01N 15/1404 |
| WO | WO 2017180325 A1 | 10/2017 | |

OTHER PUBLICATIONS

Miltenyi Biotec GmbH, CliniMACS® Cell Separation Systems, Product Catalog 2008, 48 pages.

Miltenyi Biotec GmbH, CliniMACS® User Manual, US Edition, Software 2.40, Jan. 2014, 128 pages.

Miltenyi Biotec GmbH, CliniMACS® User Manual for the CliniMACS® CD34 Reagent System, Jan. 2014, 102 pages.

Sandin et al. "Magnetophoresis and cytometry with magnetic microparticles", International Congress Series, Jun. 2007, vol. 1300, pp. 271-274.

Yang et al. "Micro flow cytometry utilizing a magnetic bead-based immunoassay for rapid virus detection", Biosensors and Bioelectronics, Dec. 1, 2008, vol. 24, No. 4, pp. 855-862.

\* cited by examiner

PARTICLE SORTING MODULE WITH ALIGNMENT WINDOW, SYSTEMS AND METHODS OF USE THEREOF

CROSS-REFERENCE TO RELATED APPLICATION

Pursuant to 35 U.S.C. § 119(e), this application claims priority to the filing date of U.S. Provisional Patent Application Ser. No. 62/752,793 filed Oct. 30, 2018; the disclosure of which application is herein incorporated by reference.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

To sort particles in the sample, a drop charging mechanism charges droplets of the flow stream containing a particle type to be sorted with an electrical charge at the break-off point of the flow stream. Droplets are passed through an electrostatic field and are deflected based on polarity and magnitude of charge on the droplet into one or more collection containers. Uncharged droplets are not deflected by the electrostatic field.

SUMMARY

Aspects of the present disclosure include a particle sorting module having an opening that is configured for visualizing droplets of a deflected flow stream. Particle sorting modules according to certain embodiments include a housing having a proximal end, a distal end and a wall therebetween having an opening positioned in the wall that is configured for aligning the flow stream with one or more sample containers at the distal end. In some embodiments, the opening is positioned in a wall downstream from a droplet deflector that deflects droplets of the flow stream into the one or more sample containers. In some instances, the opening is positioned 0.5 cm to 5 cm from the droplet deflectors. In other instances, the opening is positioned 0.5 cm to 5 cm from the sample containers at the distal end of the particle sorting module. In some embodiments, the opening includes an optical adjustment component such as a focusing lens for propagating light from an irradiation source onto the deflected flow stream. In other embodiments, the optical adjustment component is a transparent optical window. The transparent optical window in certain instances may include one or more reference identifiers, such as for example one or more markings associated with the boundaries of the one or more sample containers at the distal end of the housing. In some instances, the reference identifier includes a marking indicative of the center of the distal end of the housing. In certain instances, the particle sorting module includes a waste container and two sample containers coupled to the distal end. In some embodiments, the transparent optical window includes markings associated with the boundaries of the waste container and the two sample containers. In certain embodiments, particle sorting modules of interest include a flow cell nozzle positioned at the proximal end of the housing and a sample interrogation region in fluid communication with the flow cell nozzle. In some instances, the sample interrogation region has a cuvette (e.g., a glass or plastic cuvette). In some particle sorting modules, the cuvette is co-molded. In other particle sorting modules, the cuvette is affixed with an adhesive. In yet other particle sorting modules, the cuvette is integral with the particle sorting module. The particle sorting module may also include at the proximal end, one or more of a sample inlet and a sheath fluid inlet.

Aspects of the present disclosure also include systems for aligning a flow stream with one or more sample containers and sorting particles of a sample (e.g., a biological sample). Systems according to certain embodiments include a particle sorting module having an opening for visualizing droplets of a deflected from stream, e.g., as described above, and an imaging sensor configured to capture one or more images of the deflected flow stream through the opening. In some embodiments, the system includes a laser for irradiating the flow stream through the opening. The opening may include one or more optical adjustment components such as a focusing lens or transparent optical window. In certain embodiments, systems include a processor comprising memory operably coupled to the processor wherein the memory includes instructions stored thereon, which when executed by the processor, cause the processor to capture an image of the opening of the particle sorting module to obtain an imaged opening; and calculate a pixel location in the imaged opening of the boundaries for each of the ports at the distal end of the housing along a horizontal axis. In these embodiments, calculating the pixel location may include calculating the total number of pixels across the imaged opening along the horizontal axis; and multiplying the total number of pixels by a predetermined ratio. The predetermined ratio is, in certain instances, calculated by dividing the pixel number in the imaged opening of each port boundary by the total number of pixels across the imaged opening along the horizontal axis. In some embodiments, systems include memory with instructions stored thereon, which when executed by the processor, cause the processor to align the flow stream with one of the ports at the distal end of the housing. In other embodiments, systems include memory with instructions stored thereon, which when executed by the processor, cause the processor to align the flow stream with the center of one of the ports at the distal end of the housing. In yet other embodiments, systems include memory with instructions stored thereon, which when executed by the processor, cause the processor to align the flow stream with the center of the distal end of the housing. Systems of interest are configured for sorting particles of a sample (e.g., a biological sample) in the flow stream. In some embodiments, systems further include a sample fluid delivery subsystem and a sheath fluid delivery subsystem that is in fluid communication with an inlet at the proximal end of the particle sorting module. In certain instances, a waste tank is coupled to an outlet from the particle sorting module.

Aspects of the present disclosure also include methods for aligning a flow stream with one or more ports at a distal end of a particle sorting module. Methods according to certain embodiments include capturing an image through an opening in the particle sorting module that is configured for visualizing droplets of the flow stream; calculating a pixel location in the imaged opening of the boundaries for each of the ports at the distal end along a horizontal axis; and aligning the flow stream with the ports based on the calculated pixel locations of the boundaries for each port in the imaged opening. In some embodiments, calculating the pixel location includes calculating the total number of pixels across the imaged opening along the horizontal axis; and multiplying the total number of pixels by a predetermined ratio. In certain instances, methods further include calculating the predetermined ratio by dividing the pixel number in the imaged opening of each port boundary by the total number of pixels across the imaged opening along the horizontal axis. In some embodiments, methods include irradiating the flow stream through the opening with a light source, such as a laser. Methods according to certain instances also include sorting particles in the flow stream. In some embodiments, methods include irradiating with a light source a sample having particles in a flow stream in an interrogation region of the particle sorting module, detecting light from the sample and applying a deflection force to the particles in the flow stream sufficient to separate the particles into one or more sample containers at the distal end of the particle sorting module. In certain embodiments, the sample is a biological sample and methods include sorting and collecting two or more different types of cells.

Kits having one or more of the subject particle sorting modules are also provided. Kits according to certain embodiments include a particle sorting module comprising an opening configured for visualizing droplets of a deflected flow stream and one or more sample collection containers for coupling to the particle sorting module. Kits of interest may also include a droplet deflector. In some embodiments, the particle sorting module includes one or more of a sample inlet and sheath fluid inlet and kits may include one or more connectors for coupling the particle sorting module to the sample fluid delivery system and the sheath fluid delivery system.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
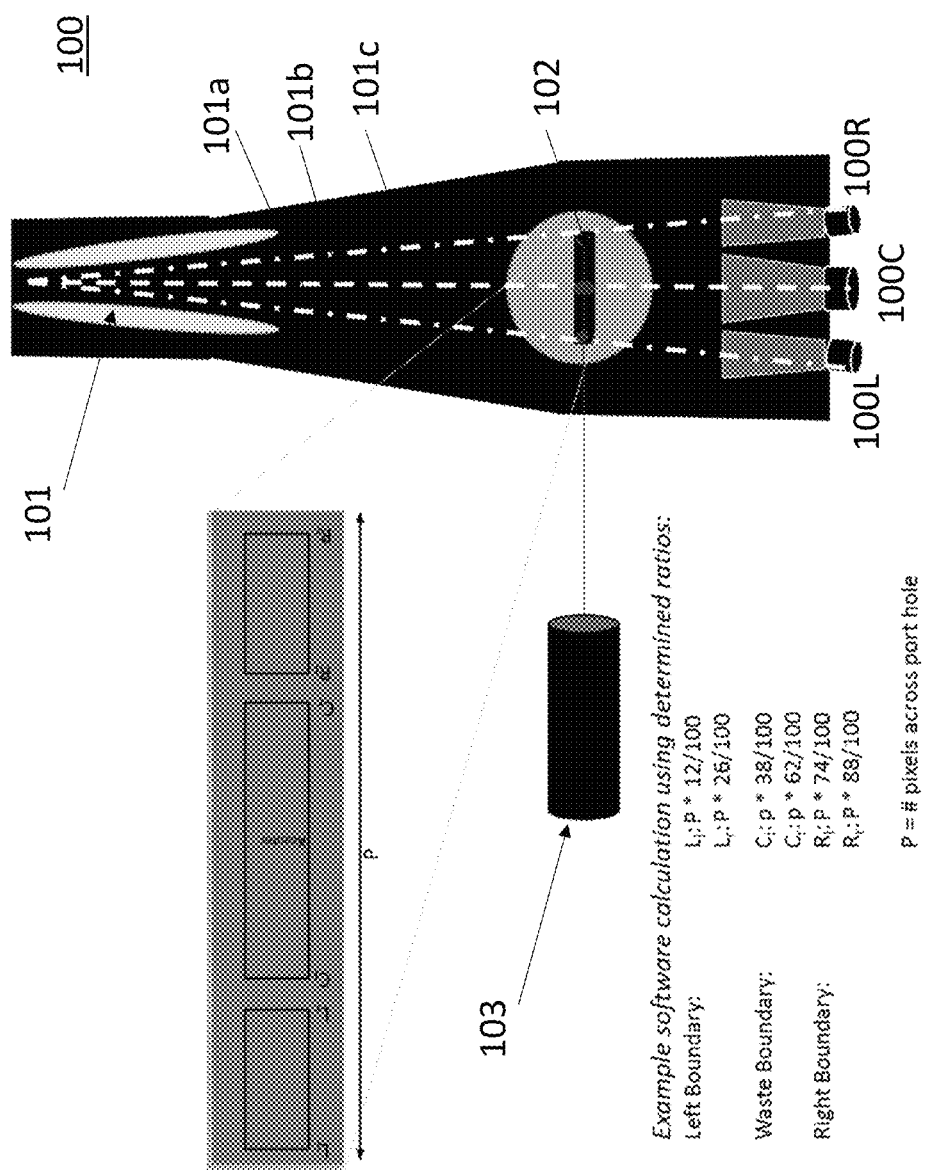
FIG. 1 depicts an example calculation for determining the boundaries of sample collection ports at the distal end of a particle sorting module according to certain embodiments.

Aspects of the present disclosure include a particle sorting module having an opening that is configured for visualizing droplets of a deflected flow stream. Particle sorting modules according to certain embodiments include a housing having a proximal end, a distal end and a wall therebetween having an opening positioned in the wall that is configured for aligning the flow stream with one or more sample containers at the distal end. Systems and methods for aligning a flow stream with one or more sample containers and sorting particles of a sample (e.g., a biological sample) are also provided. Kits having one or more of the particle sorting modules suitable for coupling with a particle sorting system and for practicing the subject methods are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides a particle sorting module for sorting particle components of a sample, such as cells in a biological sample. In further describing embodiments of the disclosure, particle sorting modules having an opening configured for visualizing droplets of a deflected flow stream (e.g., to align the deflected flow stream with one or more sample collection containers) are first described in greater detail. Next, particle sorting systems and methods for separating particles in a sample are described. Kits, including one or more particle sorting module, suitable for coupling with a particle sorting system and for practicing the subject methods are also provided.

Particle Sorting Modules Having an Opening for Visualizing a Flow Stream

As summarized above, aspects of the present disclosure include a particle sorting module having an opening that is configured for visualizing droplets of a deflected flow stream. In embodiments, the subject particle sorting module is configured to sort components of a sample, such as cells in a biological sample. The term "sorting" is used herein in its conventional sense to refer to separating components (e.g., cells, non-cellular particles such as biological macromolecules) of the sample and in some instances, as described below, delivering the separated components to one or more ports coupled to sample collection containers. For example, the subject particle sorting modules may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container at the receiving location.

In embodiments, particle sorting modules include an opening (e.g., as described in greater detail below) for visualizing droplets diverted by an applied deflection force from one or more droplet deflectors. In some embodiments, the particle sorting module is configured to produce an analyzed stream of droplets and deflect each analyzed droplet from the stream of analyzed droplets to a deflected droplet receiving location. As used herein, the term "deflected droplet receiving location" refers to a location downstream from the droplet deflectors where a sorted droplet containing a particle (e.g., cell) of interest may be collected after it has been deflected by the droplet deflector plates. In embodiments, droplets in the flow stream are diverted from their normal trajectory along the longitudinal axis of the flow stream. In some instances, the droplets in the flow stream are diverted from their normal trajectory at the flow stream break off point. By "break-off point" is meant the point in the flow stream where the continuous flow stream begins to form discrete droplets. In other instances, the droplets in the flow stream are diverted from their normal trajectory at a position downstream from the break-off point, such as 0.001 mm or more from the break-off point, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more, such as 10 mm or more, such as 15 mm or more, such as 20 mm or more, such as 25 mm or more, such as 30 mm or more, such as 35 mm or more and including where droplets are diverted from their normal trajectory by droplet deflectors 50 mm or more downstream from the flow stream break-off point.

In embodiments, droplets are diverted from their normal trajectory by the droplet deflectors by a distance of 0.001 mm or more as measured radially across a plane orthogonal to the longitudinal axis of the flow stream, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more, such as 10 mm or more, such as 15 mm or more, such as 20 mm or more, such as 25 mm or more, such as 30 mm or more, such as 35 mm or more and including 50 mm or more. For example, the droplets in the flow stream may be diverted by a distance of from 0.001 mm to 100 mm, such as from 0.005 mm to 95 mm, such as from 0.001 mm to 90 mm, such as from 0.05 mm to 85 mm, such as from 0.01 mm to 80 mm, such as from 0.05 mm to 75 mm, such as from 0.1 mm to 70 mm, such as from 0.5 mm to 65 mm, such as from 1 mm 60 mm, such as from 5 mm to 55 mm and including from 10 mm to 50 mm. As such, the droplets in the flow stream are diverted from a trajectory along the longitudinal axis of the flow stream by an angle of from 0.01° to 90°, such as from 0.05° to 85°, such as from 0.1° to 80°, such as from 0.5° to 75°, such as from 10° to 70°, such as from 15° to 65°, such as from 20° to 60°, such as from 25° to 55° and including from 30° to 50°.

Particle sorting modules of interest may include one or more sample collection ports at the droplet receiving location (e.g., at the distal end of the particle sorting module). Each sample collection port includes an opening (i.e., empty space through which droplets pass) for receiving droplets from the flow stream. In embodiments, the opening to each of the sample collection ports at the distal end of particle sorting modules described herein may be independently 0.001 mm or more from the longitudinal axis of the flow stream, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more, such as 10 mm or more, such as 15 mm or more, such as 20 mm or more, such as 25 mm or more, such as 30 mm or more, such as 35 mm or more and including 50 mm or more from the longitudinal axis of the flow stream. For example, the opening to each of the sample collection ports at the distal end of the particle sorting module may range from 0.001 mm to 100 mm, such as from 0.01 mm to 90 mm, such as from 0.1 mm to 80 mm, such as from 0.5 mm to 70 mm, such as from 1 mm to 60 mm and including from 5 mm to 50 mm. The opening to each of the sample collection ports at the distal end of particle sorting modules may each independently be at a different angle with respect to the longitudinal axis of the flow stream, such as 0.01° to 90°, such as from 0.05° to 85°, such as from 0.1° to 80°, such as from 0.5° to 75°, such as from 10° to 70°, such as from 15° to 65°, such as from 20° to 60°, such as from 25° to 55° and including from 30° to 50°. In embodiments, where the distal end of the particle sorting module includes more than one sample collection port, the space between the opening of each sample collection port may independently be 0.001 mm or more from the longitudinal axis of the flow stream, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more, such as 10 mm or more, such as 15 mm or more, such as 20 mm or more, such as 25 mm or more, such as 30 mm or more, such as 35 mm or more and including 50 mm or more. For example, the space between the opening of each sample collection port may independently vary from 0.001 mm to 100 mm, such as from 0.01 mm to 90 mm, such as from 0.1 mm to 80 mm, such as from 0.5 mm to 70 mm, such as from 1 mm to 60 mm and including from 5 mm to 50 mm.

The opening to each sample collection port may, in certain instances include a cover, such as a valve, which can be reversibly closed as desired. For example, the opening to the sample collection port may include a valve which is configured to remain closed until a flow stream is detected. In other instances, the opening to the sample collection port includes a valve that is configured to remain closed until a sample collection container is coupled to the sample collection port. In still other instances, the opening to the sample collection port includes a valve that is configured to close after a predetermined period of time (e.g., to collect only droplets from a specific portion of a sample). In yet other instances, the opening to the sample collection port includes a valve which is configured to close after detecting that a predetermined volume has been collected by a sample collection container coupled to the sample collection port. In certain instances, the opening to the sample collection port is configured to be closed in response to a user inputted command.

The opening of the sample collection port at the distal end of particle sorting modules of interest may be any suitable shape where shapes for the sample collection port openings of interest include rectilinear shapes such as squares, rectangles, trapezoids, triangles, hexagons, etc., curvilinear shapes such as circles, ovals, as well as irregular shapes, e.g., a parabolic bottom portion coupled to a planar top portion. In certain embodiments, the opening of the sample collection port has a circular shape. In other embodiments, the opening of the sample collection port has an oval shape. In still other embodiments, the opening of the sample collection port has a square or rectangular shape.

The size of the opening of each sample collection port may vary, each independently ranging from 0.1 cm to 5 cm, such as from 0.25 cm to 4.5 cm, such as from 0.5 cm to 4 cm, such as from 0.75 cm to 3.5 cm and including from 1 cm to 3 cm. Where the opening to the sample collection port is circular, the opening may have a diameter that ranges from 0.1 cm to 5 cm, such as from 0.25 cm to 4.5 cm, such as from 0.5 cm to 4 cm, such as from 0.75 cm to 3.5 cm and including a diameter from 1 cm to 3 cm.

Particle sorting modules of interest may include 1 or more sample collection ports at the distal end of the housing, such as 2 or more, such as 3 or more, such as 4 or more, such as 5 or more, such as 6 or more, such as 7 or more, such as 8 or more, such as 9 or more and including 10 or more sample collection ports. Where the sample collection port is coupled to a sample collection container (e.g., a waste collection container), the particle sorting module may include 1 or more sample collection containers coupled to the particle sorting module housing, such as 2 or more, such as 3 or more, such as 4 or more, such as 5 or more, such as 6 or more, such as 7 or more, such as 8 or more, such as 9 or more and including 10 or more sample collection containers.

Sample collection containers may be coupled to the sample collection ports at the distal end of the particle soring module by any convenient attachment protocol. In some embodiments, the sample collection container is mechanically coupled to sample collection port such as by a luer-lok connection, a sterile tube weld or by being screw threaded to the sample collection port. In other embodiments, the sample collection container is affixed to the sample collection port by a permanent or non-permanent adhesive. In still other embodiments, the sample collection container is co-molded with the sample collection port. In yet other embodiments, the sample collection container is integrated together with the particle sorting module housing, such that the sample collection container and particle sorting module housing form a single unit. In yet other instances, the sample collection container may be fluidically coupled to the sample collection port, e.g., via tubing configured to convey sorted droplets, where such embodiments may provide for sterile retrieval of sorted droplets, e.g., by pinching and cutting the fluid conveyance structure, e.g., tubing. Suitable sample collection containers for collecting droplets from the flow stream may include, but are not limited to, test tubes, conical tubes, multi-compartment containers such as microtiter plates (e.g., 96-well plates), centrifuge tubes, culture tubes, microtubes, caps, cuvettes, bottles, rectilinear polymeric containers, and bags, among other types of containers.

Diversion of a droplet of interest to a sample collection container (e.g., through a sample collection port) may be achieved by the droplet deflector via electrostatic charging of the droplet and deflection of the charged droplet from the flow stream by the application of an electrostatic field. The voltage applied to the metallic plates of the droplet deflectors in the subject particle sorting modules may be 10 mV or more, such as 25 mV or more, such as 50 mV or more, such as 75 mV or more, such as 100 mV or more, such as 250 mV or more, such as 500 mV or more, such as 750 mV or more, such as 1 V or more, such as 2.5 V or more, such as 5 V or more, such as 10 V or more, such as 25 V or more, such as 50 V or more and including 100 V or more, such as 500 V or more, such as 1000 V or more, such as 5000 V or more, such as 10000 V or more, such as 15000 V or more, such as 25000 V or more, such as 50000 V or more and including 100000 V or more. In certain embodiments, the voltage applied to each set of parallel metallic plates is from 0.5 kV to 15 kV, such as from 1 kV to 15 kV, such as from 1.5 kV to 12.5 kV and including from 2 kV to 10 kV.

Particles in the flow stream may be deflected by any convenient deflector plate protocol, including but not limited to cell sorting deflector plates as described in U.S. Pat. Nos. 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039, the disclosures of which are herein incorporated by reference in their entirety. In certain embodiments, the deflector plates include charged plates for sorting cells in the flow stream as used in flow cytometry systems such as the BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

The opening in the particle sorting module as described herein is configured for visualizing the deflected droplets and in certain instances, the sample collection containers at the droplet receiving location. As summarized above, the particle sorting module in some embodiments includes a housing having a proximal end, a distal end and a wall therebetween with the opening for visualizing the deflected droplets positioned in the wall. The opening may be any suitable shape where shapes for the visualization opening of interest include, but are not limited to: rectilinear shapes such as squares, rectangles, trapezoids, triangles, hexagons, etc., curvilinear shapes such as circles, ovals, as well as irregular shapes, e.g., a parabolic bottom portion coupled to a planar top portion. In certain embodiments, the opening in the wall of the particle sorting module housing has a circular shape. In other embodiments, the opening in the wall of the particle sorting module housing has an oval shape. In still other embodiments, the opening in the wall of the particle sorting module housing has a square or rectangular shape.

The size of the opening in the wall of the particle sorting module housing may vary, in some embodiments having a width ranging from 0.5 cm to 10 cm such as from 1 cm to 9.5 cm, such as from 1.5 cm to 9 cm, such as from 2 cm to 8.5 cm, such as from 2.5 cm to 8 cm, such as from 3 cm to 7.5 cm, such as from 3.5 cm to 7 cm, such as from 4 cm to 6.5 cm and including from 4 cm to 6 cm, for example 5 cm and a length ranging from 1 cm to 20 cm, such as from 1.5 cm to 19.5 cm, such as from 2 cm to 19 cm, such as from 2.5 cm to 18.5 cm, such as from 3 cm to 18 cm, such as from 3.5 cm to 17.5 cm, such as from 4 cm to 17 cm, such as from 4.5 cm to 16.5 cm and including from 5 cm to 15 cm, for example 10 cm. In certain embodiments, the opening in the wall of the particle sorting module housing is circular and the diameter of the opening ranges from 0.5 cm to 10 cm such as from 1 cm to 9.5 cm, such as from 1.5 cm to 9 cm, such as from 2 cm to 8.5 cm, such as from 2.5 cm to 8 cm, such as from 3 cm to 7.5 cm, such as from 3.5 cm to 7 cm, such as from 4 cm to 6.5 cm and including from 4 cm to 6 cm, for example 5 cm. As described in greater detail below, in certain instances an image is captured through the opening in the particle sorting module and a number of pixels across a horizontal axis of the opening is calculated. Depending on the size of the opening and each pixel size, the opening in the wall of the particle sorting module housing may vary, and in some instances is configured to provide for an image ranging from $1 \times 10^1$ pixels to $1 \times 10^6$ pixels, such as from $5 \times 10^1$ pixels to $5 \times 10^5$ pixels, such as from $1 \times 10^2$ pixels to $1 \times 10^5$ pixels, such as from $5 \times 10^2$ pixels to $5 \times 10^4$ pixels and including from $1 \times 10^3$ pixels to $1 \times 10^4$ pixels.

The opening in the wall of the particle sorting module housing is positioned between the droplet deflector and the distal end of the housing. Depending on the length of the particle sorting module, in some embodiments the upper boundary of the opening is positioned from 0.5 cm to 25 cm from the bottom of the droplet deflector, such as from 1 cm to 24.5 cm, such as from 1.5 cm to 24 cm, such as from 2 cm to 23.5 cm, such as from 2.5 cm to 23 cm, such as from 3 cm to 22.5 cm, such as from 3.5 cm to 22 cm, such as from 4 cm to 21.5 cm, such as from 4.5 cm to 21 cm and including where the upper boundary of the opening in the wall of the particle sorting module housing is positioned from 5 cm to 20 cm from the bottom of the droplet deflector. In some embodiments, the lower boundary (i.e., bottom) of the opening in the wall of the particle sorting module housing is positioned from 0.5 cm to 10 cm from the distal end of the housing, such as 1 cm to 9.5 cm, such as from 1.5 cm to 9 cm, such as from 2 cm to 8.5 cm, such as from 2.5 cm to 8 cm, such as from 3 cm to 7.5 cm, such as from 3.5 cm to 7 cm, such as from 4 cm to 6.5 cm and including where the lower boundary (i.e., bottom) of the opening in the wall of the particle sorting module housing is positioned from 4 cm to 6 cm, for example 5 cm.

In some embodiments, the opening in the wall of the particle sorting module housing includes one or more optical adjustment components. By "optical adjustment" is meant that light propagated through the opening or light collected from an irradiated flow stream through the opening is changed as desired. Optical adjustment components may be any convenient device or structure which provides the desired change in the light and may include, but is not limited to, optical windows (e.g., transparent windows) lenses, mirrors, pinholes, slits, gratings, light refractors, and any combinations thereof. The opening in the wall of the particle sorting module housing may include one or more optical adjustment components at the sample interrogation region as needed, such as two or more, such as three or more, such as four or more and including five or more optical adjustment components.

In some instances, the opening in the wall of the particle sorting module housing includes a transparent optical window. By "optically transparent" is meant that optical window does not restrict the propagation of at least one or more wavelengths of light therethrough. In some embodiments, the optical window is optically transparent to one or more of ultraviolet light, visible light and near-infrared light. In one example, the optical window is transparent to ultraviolet light. In another example, the optical window is transparent to visible light. In yet another example, the optical window is transparent to near-infrared light. In still another example, the optical window is transparent to ultraviolet light and visible light. In still another example, the optical window is transparent to visible light and near-infrared light. In still another example, the optical window is transparent to ultraviolet light, visible light and near-infrared light. Depending on the desired light propagation properties, the transparent optical window may be formed from any suitable material, such as quartz, glass, silica, titanium dioxide, zinc oxide, silicon nitride, carbon black, aluminum oxide or polymeric, including but not limited to optically transparent polymers such as acrylics, acrylics/styrenes, cyclo-olefin polymers, polycarbonates, polyesters and polystyrenes, among other optically transparent polymers. The optically transparent region may extend across 5% or more of the optical window, such as across 10% or more, such as across 25% or more, such as across 50% or more, such as across 75% or more, such as across 90% or more, such as across 95% or more and including across 99% or more of the optical window. In certain embodiments, the entire optical window (i.e., 100%) is optically transparent. For example, the optically transparent region may extend across from 5% to 100% of the optical window, such as from 10% to 90%, such as from 20% to 80%, such as from 30% to 70% and including from 40% to 60%.

In certain embodiments, the optical window includes one or more reference identifiers. In some instances, the reference identifiers may include markings associated with a boundary of the deflected flow stream. For example, the markings delineate the deflection path of the flow stream. These markings may be associated, for instance, with the charge of the droplet deflector plates or the applied voltage of to the droplet deflector plates. In other instances, the markings are associated with the boundaries of one or more ports at the distal end of the housing. For instance, the optical window may include reference identifiers that delineate the boundaries of one or more ports that are coupled to sample collection containers. In some instances, the optical window includes a reference identifier for aligning the flow stream with one or more of the ports. For example, the optical window may include a reference identifier that is indicative of the position of a waste collection port at the distal end of the particle sorting module housing. In certain embodiments, the optical window includes a reference identifier that is indicative of the center of the distal end of the housing. For example, the optical window may include a reference identifier for aligning the flow stream with the center of the distal end of the particle sorting module housing.

In some embodiments, the opening in the particle sorting module housing includes an optical adjustment component for adjusting the light irradiated onto the deflected flow stream by a light source (e.g., laser). For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the collected the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam (e.g., reducing the beam profile of a laser)

In some embodiments, the opening in the particle sorting module housing includes a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In some embodiments, particle sorting modules also include a flow cell nozzle having a nozzle orifice configured to flow a flow stream through the flow cell nozzle and one or more of the subject droplet deflectors described above, which are configured to apply a deflection force to a flow stream flowing therebetween. The subject particle sorting module includes a flow cell nozzle having an orifice which propagates a fluidic sample to a sample interrogation region, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more, such as 100 μL/sec or more, such as 150 μL/sec or more, such as 200 μL/sec or more, such as 250 μL/sec or more, such as 300 μL/sec or more, such as 350 μL/sec or more, such as 400 μL/sec or more, such as 450 μL/sec or more and including 500 μL/sec or more. For example, the sample flow rate may range from 1 μL/sec to about 500 μL/sec, such as from 2 μL/sec to about 450 μL/sec, such as from 3 μL/sec to about 400 μL/sec, such as from 4 μL/sec to about 350 μL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more. For example, the sheath fluid flow rate may range from 1 μL/sec to about 500 μL/sec, such as from 2 μL/sec to about 450 μL/sec, such as from 3 μL/sec to about 400 μL/sec, such as from 4 μL/sec to about 350 μL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The particle sorting module also includes a sample interrogation region in fluid communication with the flow cell nozzle orifice. As described in greater detail below, a sample flow stream emanates from an orifice at the distal end of the flow cell nozzle and particles in the flow stream may be irradiated with a light source at the sample interrogation region of the particle sorting module. The size of the interrogation region of the particle sorting module may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more of the particle sorting module.

The interrogation region on the particle sorting module may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region on the particle sorting module includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region of the particle sorting module may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the particle sorting module at the interrogation region may be formed from any transparent material which passes the desired range of wavelength, including but not limited to optical glass, borosilicate glass, Pyrex glass, ultraviolet quartz, infrared quartz, sapphire as well as plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In some embodiments, particle sorting modules of interest include a cuvette positioned in the sample interrogation region. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In some embodiments, the particle sorting module has an enclosed housing. The term "enclosed" is meant that each component of the particle sorting module is fully contained within the housing and the components are sealed off or isolated from the ambient environment. In other words, the components within the enclosed housing are not exposed to or have no contact with the outside environment. In some embodiments, the components contained within the housing are isolated from the gaseous environment of the ambient environment (i.e., are not exposed to the gases outside of the housing). In other embodiments, the components contained within the housing are isolated from the fluidic environment of the ambient environment (i.e., are not exposed to any fluids present outside of the housing). In yet other embodiments, the components contained within the housing are sterile and are isolated from live bacteria or other microorganisms that are present in the ambient environment (i.e., sterile).

The size of the particle sorting module housing may vary having a length that ranges from 10 cm to 100 cm, such as from 15 cm to 95 cm, such as from 20 cm to 90 cm, such as from 25 cm to 85 cm, such as from 30 cm to 80 cm, such as from 35 cm to 75 cm and including from 40 cm to 60 cm. The width of the particle sorting module housing may range from 1 cm to 25 cm, such as from 2 cm to 20 cm, such as from 3 cm to 15 cm and including from 5 cm to 10 cm.

The housing may be formed from any suitable material that is compatible with a fluidic sample (e.g., biological sample), including metal, glass (e.g., Pyrex glass, borosilicate glass), ceramic or plastic. In certain embodiments, the particle sorting module housing is formed from a plastic, such as a rigid plastic, polymeric or thermoplastic material. For example, suitable plastics may include, but are not limited to polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials. In certain embodiments, the particle sorting module housing is formed from a polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediylalkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc.

In some embodiments, one or more of the outer walls of the particle sorting module housing have aligners for coupling the housing to a particle sorting system (as described in greater detail below). For example, the housing may have 2 or more walls having aligners for coupling the housing to a particle sorting system, such as 3 or more walls and including 4 or more walls having aligners. In certain embodiments, the housing has one wall having aligners for coupling the housing to a particle sorting system. Each wall having an aligner may include 1 or more aligner, such as 2 or more aligners, such as 3 or more aligners, such as 4 or more aligners, such as 5 or more aligners, such as 7 or more aligners and including 10 or more aligners. In certain embodiments, the particle sorting device includes an outer wall with 3 aligners.

Any suitable type of aligner may be employed, such as an alignment protrusion, an alignment rail, an alignment notch, an alignment groove, an alignment slot, an alignment countersink, an alignment counter-bore, an alignment recess, an alignment hole or a combination thereof. For example, in some instances an outer wall of the housing includes one or more protrusions, such as a pin, a dowel or a bump. In certain embodiments, the aligner is a pin, such as a ball tipped pin. In other instances, an outer wall of the housing includes one or more recesses, such as a hole or a notch. In certain instances, an outer wall of the housing includes one or more alignment protrusions and one or more alignment recesses.

The shape of the aligners may vary, where cross-sectional shapes of interest include, but are not limited to rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some embodiments, the aligners are cylindrically shaped. In other embodiments, the aligners are spherical. In yet other embodiments, the aligners are polygonal-shaped, such as square-shaped or rectangular. In certain embodiments, the aligner is a cylindrical pin having a spherical tip (e.g., ball tipped pin). Each aligner may have the same or different shape depending on the coupling register of the particle sorting system (as described in greater detail below). In some embodiments, each aligner has the same shape. In other embodiments, each aligner has a different shape. In yet other embodiments, two or more aligners have the same shape and one or more aligners have a different shape.

In some embodiments, the outer wall of the housing includes one or more fasteners for maintaining the particle sorting module in contact with the particle sorting system (as described in greater detail below). Suitable fasteners may include, but are not limited to magnets, hook and loop fasteners, Velcro, non-permanent adhesives or a combination thereof. In certain embodiments, the outer wall of the housing includes one or more magnets for coupling to one or more magnets on the register of the particle sorting system. In these embodiments, alignment between the particle sorting module and the register may be achieved by coupling magnets on the register with the magnets on the outer wall of the particle sorting module housing. In some embodiments, the particle sorting module includes both aligners and magnets. In other embodiments, the aligner includes one or more magnets, such as a protrusion (e.g., ball tipped pin protrusion) that has a magnet at the tip. In certain embodiments, the aligner is a magnet, such as a magnetic protrusion, a magnetic ball at the tip of a pin protrusion or a magnet positioned within a hole or a recess. The term "magnet" is used herein in its conventional sense to refer to a magnetic material that has a persistent magnetic field such that the magnetic field from the magnet does not substantially decrease over time. For example, the magnet may be an iron alloy material having aluminum, nickel and cobalt (i.e., Alnico magnets), a ceramic or ferrite magnet, a rare-earth magnet such as samarium-cobalt magnets (e.g., $SmCo_5$), neodymium alloy (NdFeB) magnets (e.g., $Nd_2Fe_{14}B$) or a combination thereof. Depending on the size of the magnet, the magnet field produced by magnets of interest positioned at the connector proximal end range from 0.01 T to 10 T, or from 0.01 T to 5 T, or from 0.01 T to 2 T, or from 0.1 T to 2 T, or from 0.1 T to 1.5 T, including from 0.1 T to 1 T.

In certain embodiments, the particle sorting module is an enclosed particle sorting module, such as those described in U.S. Patent Publication No. 2017/0299493, filed on Mar. 28, 2017, the disclosure of which is incorporated herein by reference.

In certain embodiments, particle sorting modules of interest include one or more sets of integrated droplet deflectors. The subject droplet deflectors may include 2 or more sets of parallel metallic plates, such as 3 or more, such as 4 or more, such as 5 or more, such as 6 or more, such as 7 or more, such as 8 or more, such as 9 or more and including 10 or more sets of parallel metallic plates. The parallel metallic plates of the subject droplet deflectors may be formed from any suitable metal capable of producing an electric field and may include but is not limited to aluminum, brass, chromium, cobalt, copper, gold, indium, iron, lead, nickel, platinum, palladium, tin, steel (e.g., stainless steel), silver, zinc and combinations and alloys thereof, such as for example an aluminum alloy, aluminum-lithium alloy, an aluminum-nickel-copper alloy, an aluminum-copper alloy, an aluminum-magnesium alloy, an aluminum-magnesium oxide alloy, an aluminum-silicon alloy, an aluminum-magnesium-manganese-platinum alloy, a cobalt alloy, a cobalt-chromium alloy, a cobalt-tungsten alloy, a cobalt-molybdenum-carbon alloy, a cobalt-chromium-nickel-molybdenum-iron-tungsten alloy, a copper alloy, a copper-arsenic alloy, a copper-berrylium alloy, a copper-silver alloy, a copper-zinc alloy (e.g., brass), a copper-tin alloy (e.g., bronze), a copper-nickel alloy, a copper-tungsten alloy, a copper-gold-silver alloy, a copper-nickel-iron alloy, a copper-manganese-tin alloy, a copper-aluminum-zinc-tin alloy, a copper-gold alloy, a gold alloy, a gold-silver alloy, an indium alloy, an indium-tin alloy, an indium-tin oxide alloy, an iron alloy, an iron-chromium alloy (e.g., steel), an iron-chromium-nickel alloy (e.g., stainless steel), an iron-silicon alloy, an iron-chromium-molybdenum alloy, an iron-carbon alloy, an iron-boron alloy, an iron-magnesium alloy, an iron-manganese alloy, an iron molybdenum alloy, an iron-nickel alloy, an iron-phosphorus alloy, an iron-titanium alloy, an iron-vanadium alloy, a lead alloy, a lead-antimony alloy, a lead-copper alloy, a lead-tin alloy, a lead-tin-antimony alloy, a nickel alloy, a nickel-manganese-aluminum-silicon alloy, a nickel-chromium alloy, a nickel-copper alloy, a nickel, molybdenum-chromium-tungsten alloy, a nickel-copper-iron-manganese alloy, a nickel-carbon alloy, a nickel-chromium-iron alloy, a nickel-silicon alloy, a nickel-titanium alloy, a silver alloy, a silver-copper alloy (e.g., sterling silver) a silver-coper-germanium alloy (e.g., Argentium sterling silver), a silver-gold alloy, a silver-copper-gold alloy, a silver-platinum alloy, a tin alloy, a tin-copper-antimony alloy, a tin-lead-copper alloy, a tin-lead-antimony alloy, a titanium alloy, a titanium-vanadium-chromium alloy, a titanium-aluminum alloy, a titanium-aluminum-vanadium alloy, a zinc alloy, a zinc-copper alloy, a zinc-aluminum-magnesium-copper alloy, a zirconium alloy, a zirconium-tin alloy or a combination thereof.

The parallel metallic plates of the subject droplet deflectors may be any suitable shape, such as a circle, oval, half-circle, crescent-shaped, star-shaped, square, triangle, rhomboid, pentagon, hexagon, heptagon, octagon, rectangle or other suitable polygon. In certain embodiments, the parallel metallic plates are rectangular. As described in greater detail below, in certain instances the parallel metallic plates are twisted, such as twisted rectangles having a twist angle that 5° or more, such as 10° or more, such as 15° or more, such as 20° or more, such as 25° or more, such as 30° or more, such as 35° or more, such as 40° or more, such as 45° or more, such as 50° or more, such as 55° or more and including having a twist angle of 60° or more.

Depending on the shape of the metallic plates, the dimensions may vary. In some embodiments, each metallic plate has a width that ranges from 0.5 mm to 10 mm, such as from 1 mm to 9.5 mm, such as from 1.5 mm to 9 mm, such as from 2 mm to 8.5 mm, such as from 2.5 mm to 8 mm, such as from 3 mm to 7.5 mm, such as from 3.5 mm to 7 mm, such as from 4 mm to 6.5 mm and including a width than ranges from 4.5 mm to 6 mm. The length also varies ranging from 10 mm to 500 mm, such as from 15 mm to 450 mm, such as from 20 mm to 400 mm, such as from 25 mm to 350 mm, such as from 30 mm to 300 mm, such as from 35 mm to 250 mm, such as from 40 mm to 200 mm, such as from 45 mm to 150 mm and including from 50 mm to 100 mm. In certain embodiments, the metallic plates are an asymmetric polygon where a first end has a width that is smaller than the width of the second end. The width at each end may range from 0.01 mm to 10 mm, such as from 0.05 mm to 9.5 mm, such as from 0.1 mm to 9 mm, such as from 0.5 mm to 8.5 mm, such as from 1 mm to 8 mm, such as from 2 mm to 8 mm, such as from 2.5 mm to 7.5 mm and including from 3 mm to 6 mm. In certain embodiments, the cover bar is an asymmetric polygon having a first end having a width from 1 to 10 mm and a second end having a width from 2 to 5 mm. For example, the cover bar may be an asymmetric polygon having a first end having a 5 mm width and a second end having a 10 mm width. In embodiments, the surface area of each metallic plate may vary as desired and may range from 0.25 to 15 cm$^2$, such as 0.5 to 14 cm$^2$, such as 0.75 to 13 cm$^2$, such as 1 to 12 cm$^2$, such as 1.5 to 11 cm$^2$, and including 2 to 10 cm$^2$.

In certain embodiments, particle sorting modules include one or more droplet deflectors such as those described in U.S. Patent Publication No. 2018/0095022, filed on Jun. 14, 2017, the disclosure of which is incorporated herein by reference.

In some embodiments, the outer wall of the housing includes one or more electrical connections configured for electrical connectivity between the particle sorting module and the particle sorting system. For example, the outer housing may include 2 or more electrical connections, such as 3 or more electrical connections, such as 4 or more electrical connections, such as 5 or more electrical connections and including 10 or more electrical connections. The electrical connection, in some embodiments, provides power to the droplet deflector plates. Any convenient electrical connection may be employed, such as conductive pins, pads, wires or coils which protrude or are recessed within the outer walls of the housing. In certain embodiments, particle sorting modules of interest include 5 or more electrical pins.

Particle Sorting Systems

Aspects of the present disclosure also include systems for sorting particle components of a sample, such as cells in a biological sample. Systems according to certain embodiments include a particle sorting module having an opening configured for visualizing droplets of a deflected flow stream as described above and an imaging sensor configured to capture one or more images through the opening (e.g., the boundaries of sample collection ports at the distal end of the particle sorting module).

In embodiments, the imaging sensor may be any suitable device capable of capturing and converting an optical image into an electronic data signal, including but not limited to charge-coupled devices, semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera.

The number of imaging sensors in the subject systems may vary, as desired. For example, the subject systems may include one imaging sensor or more, such as two imaging sensors or more, such as three imaging sensors or more, such as four imaging sensors or more, such as five imaging sensors or more and including ten imaging sensors or more. In certain embodiments, systems include one imaging sensor. In other embodiments, systems include two imaging sensors. Where systems include more than one imaging sensor, each imaging sensors may be oriented with respect to the other (as referenced in an X-Y plane) at an angle ranging from 10° to 90°, such as from 15° to 85°, such as from 20° to 80°, such as from 25° to 75° and including from 30° to 60°. In certain embodiments, each imaging sensor is oriented orthogonally (as referenced in an X-Y plane) to each other. For example, where the subject systems include two imaging sensors, the first imaging sensor is oriented orthogonally (as referenced in an X-Y plane) to the second imaging sensor.

Where the subject systems include more than one imaging sensor, each imaging sensor may be the same or a combination of sensors. For example, where the subject systems include two imaging sensors, in some embodiments the first imaging sensor is a CCD-type device and the second imaging sensor is a CMOS-type device. In other embodiments, both the first and second imaging sensor are CCD-type devices. In yet other embodiments, both the first and second imaging sensors are CMOS-type devices.

In some embodiments, the imaging sensors are stationary, maintaining a single position with respect to the opening in the particle sorting module housing. In other embodiments, the imaging sensors may be configured to move, such as along the path of the deflected flow stream. For instance, the imaging sensor may be configured to move upstream and downstream alongside the deflected flow stream capturing images in a plurality of detection fields through the opening in the particle sorting module housing. Where the imaging sensor is configured to move, the imaging sensor may be displaced continuously. In other embodiments, the imaging sensor may be displaced in discrete intervals, such as for example in 1 mm or greater increments, such as 2 mm or greater increments and including 5 mm or greater increments.

The imaging sensor may be configured to capture images continuously or in discrete intervals. In some instances, imaging sensors of interest are configured to capture images continuously. In other instances, imaging sensors are configured to take measurements in discrete intervals, such as capturing an image of the flow stream every 0.001 millisecond, every 0.01 millisecond, every 0.1 millisecond, every 1 millisecond, every 10 milliseconds, every 100 milliseconds and including every 1000 milliseconds, or some other interval.

As described in greater detail below, the imaging sensor is configured to capture one or more images of the deflected flow stream. For example, the imaging sensor may be configured to capture 2 or more images of the deflected flow stream, such as 3 or more images, such as 4 or more images, such as 5 or more images, such as 10 or more images, such as 15 or more images and including 25 or more images. Where a plurality of images are captured, the processor may include digital imaging processing algorithm for combining, when desired, the plurality of images.

Depending on the desired image resolution, the imaging sensor may have an exposure time of 100 ms or less when reading out the full sensor, such as 75 ms or less, such as 50 ms or less, such as 25 ms or less, such 10 ms or less, such as 5 ms or less, such as 1 ms or less, such as 0.1 ms or less such as 0.01 ms or less, such as 0.001 ms or less, such as 0.0001 ms or less, such as 0.00001 ms or less and including an exposure time of 0.000001 ms or less. For example, the exposure time of the imaging sensor may range from 0.0001 ms to 10 ms, such as from 0.001 ms to 5 ms, such as from 0.01 ms to 2 ms and including from 0.1 ms to 1 ms.

In certain embodiments, imaging sensors in the subject systems may have 1M active pixels or more, such as 1.5M or more, e.g., 2M or more, 2.5M or more, or 3M or more. In certain aspects, a pixel corresponds to an actual physical dimension of about 0.3 μm. Depending on the detection field, in some instances, imaging sensors have a sensor area of 150 mm$^2$ or more, such as about 150 mm$^2$ to about 175 mm$^2$, about 175 mm$^2$ to about 200 mm$^2$, 200 mm$^2$ to about 225 mm$^2$, about 225 mm$^2$ to about 250 mm$^2$, about 250 mm$^2$ to about 300 mm$^2$, about 300 mm$^2$ to about 400 mm$^2$, about 400 mm$^2$ to about 500 mm$^2$, about 500 mm$^2$ to about 750 mm$^2$, about 750 mm$^2$ to about 1000 mm$^2$, or about 1000 mm$^2$ or more.

The imaging sensor may be positioned at any suitable distance from the opening in the particle sorting module housing so long as the sensor is capable of capturing an image of the deflected flow stream through the opening. For example, the imaging sensor may be positioned 0.01 mm or more from the opening in the particle sorting module housing, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the opening in the particle sorting module housing.

In some instances, the imaging sensor also includes an optical adjustment component. The optical adjustment component may be configured to change the captured images as desired, such as to increase or decrease the captured dimensions or to enhance the optical resolution of the image. In some instances, optical adjustment is a magnification protocol configured to increase the size of the detection field captured by the imaging sensor, such as by 5% or greater, such as by 10% or greater, such as by 25% or greater, such as by 50% or greater and including increasing the detection field of the imaging sensor by 75% or greater. In other instances, optical adjustment is a de-magnification protocol configured to decrease the size of the detection field captured by the imaging sensor, such as by 5% or greater, such as by 10% or greater, such as by 25% or greater, such as by 50% or greater and including decreasing the size of the detection field captured by the imaging sensor by 75% or greater. In certain embodiments, optical adjustment is an enhanced resolution protocol configured to improve the resolution of the captured images, such as by 5% or greater, such as by 10% or greater, such as by 25% or greater, such as by 50% or greater and including enhancing the resolution of the captured images by 75% or greater. Capturing images by the imaging sensor may be adjusted with any convenient optical adjustment protocol, including but not limited to lens, mirrors, filters and combinations thereof. In certain embodiments, the imaging sensor includes a focusing lens. The focusing lens, for example may be a de-magnifying lens. In other embodiments, the focusing lens is a magnifying lens.

Imaging sensors of the present disclosure may also include one or more wavelength separators. The term "wavelength separator" is used herein in its conventional sense to refer to an optical protocol for separating polychromatic light into its component wavelengths for detection. Wavelength separation, according to certain embodiments, may include selectively passing or blocking specific wavelengths or wavelength ranges of the polychromatic light. To separate wavelengths of light, the transmitted light may be passed through any convenient wavelength separating protocol, including but not limited to colored glass, bandpass filters, interference filters, dichroic mirrors, diffraction gratings, monochromators and combinations thereof, among other wavelength separating protocols. Systems may include one or more wavelength separators, such as two or more, such as three or more, such as four or more, such as five or more and including 10 or more wavelength separators. In one example, imaging sensors include one bandpass filter. In another example, imaging sensors include two or more bandpass filters. In another example, imaging sensors include two or more bandpass filters and a diffraction grating. In yet another example, imaging sensors include a plurality of bandpass filters and a monochromator. In certain embodiments, imaging sensors include a plurality of bandpass filters and diffraction gratings configured into a filter wheel setup. Where imaging sensors include two or more wavelength separators, the wavelength separators may be utilized individually or in series to separate polychromatic light into component wavelengths. In some embodiments, wavelength separators are arranged in series. In other embodiments, wavelength separators are arranged individually such that one or more measurements are conducted using each of the wavelength separators.

In some embodiments, systems include one or more optical filters, such as one or more bandpass filters. For example, in some instances the optical filters of interest are bandpass filters having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. In other instances, the optical filters are longpass filters, such as for example longpass filters which attenuate wavelengths of light of 1600 nm or less, such as 1550 nm or less, such as 1500 nm or less, such as 1450 nm or less, such as 1400 nm or less, such as 1350 nm or less, such as 1300 nm or less, such as 1000 nm or less, such as 950 nm or less, such as 900 nm or less, such as 850 nm or less, such as 800 nm or less, such as 750 nm or less, such as 700 nm or less, such as 650 nm or less, such as 600 nm or less, such as 550 nm or less, such as 500 nm or less and including a longpass filter which attenuates wavelengths of light of 450 nm or less. In yet other instances, the optical filters are shortpass filters, such as for example shortpass filters which attenuate wavelengths of light of 200 nm or greater, such as 250 nm or greater, such as 300 nm or greater, such as 350 nm or greater, such as 400 nm or greater, such as 450 nm or greater, such as 500 nm or greater, such as 550 nm or greater and including shortpass filters which attenuate wavelengths of light of 600 nm or greater.

In other embodiments, the wavelength separator is a diffraction grating. Diffraction gratings may include, but are not limited to transmission, dispersive or reflective diffraction gratings. Suitable spacings of the diffraction grating may vary depending on the configuration of the light source, detection field and imaging sensor and other optical adjust protocols present (e.g., focusing lens), ranging from 0.01 μm to 10 μm, such as from 0.025 μm to 7.5 μm, such as from 0.5 μm to 5 μm, such as from 0.75 μm to 4 μm, such as from 1 μm to 3.5 μm and including from 1.5 μm to 3.5 μm.

In some embodiments, each imaging sensor is operably coupled to one or more light sources for illuminating the flow stream through the opening in the particle sorting module housing. In some embodiments, the light source is a laser, such as continuous wave laser. For example, the laser may be a diode laser, such as a ultraviolet diode laser, a visible diode laser and a near-infrared diode laser. In some instances, the diode laser outputs light at wavelengths ranging from 375 nm to 1000 nm, such as from 405 nm to 875 nm, such as from 450 nm to 800 nm, such as from 500 nm to 650 nm and including from 525 nm to 625 nm. In certain embodiments, lasers of interest include a 405 nm diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof. In certain embodiments, the light source is a low power laser (e.g., a 650 nm laser outputting 5 mW).

In other embodiments, the light source is a non-laser light source, such as a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources for illuminating the flow stream through the opening in the particle sorting module during image capture include an array of infra-red LEDs.

In other embodiments, the light source is a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED, laser diode or a broadband light source coupled to one or more optical bandpass filters, diffraction gratings, monochromators or any combination thereof.

In embodiments, the imaging sensor is configured to capture an image through the opening of the particle sorting module housing in a detection field. By "detection field" is meant field of view through the opening in the particle sorting module housing captured by the imaging sensor. The detection field imaged may vary. In some embodiments, the detection field is a predetermined length of the deflected flow stream. In other embodiments, the detection field is a predetermined portion of the opening in the particle sorting module housing. In some embodiments, the imaging sensor is configured to capture an image of the deflected flow stream emanating from droplet deflectors in a detection field. In embodiments, an image detection field may span 0.001 cm or more of the deflected flow stream, such as 0.005 cm or more, such as 0.01 cm or more, such as 0.05 cm or more, such as 0.1 cm or more, such as 0.5 cm or more, such as 1 cm or more, such as 2 cm or more, such as 5 cm or more and including 10 cm or more of the deflected flow stream.

In some embodiments, the detection field includes the positions of the sample collection ports at the distal end of the particle sorting module housing. In certain instances, the sample collection ports are coupled to sample collection containers and the imaging sensor is configured to capture the positions of the sample collection containers at the distal end of the housing. In certain embodiments, the imaging sensor is configured to capture an image through the opening of the particle sorting module housing to obtain an imaged opening and a processor operatively coupled to the imaging sensor is configured to calculate a location in the imaged opening of the boundaries for each of the sample collection ports at the distal end of the housing along a horizontal axis. In some instances, calculating the location of the boundaries includes determining the distance between the boundaries of each of the sample collection ports. For instance, the processor may be configured to calculate based on the imaged opening that the boundary for a first sample collection port is from 0.1 mm to 100 mm from the left-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm. In other instances, the processor may be configured to calculate based on the imaged opening that the boundary for a second sample collection port is from 0.1 mm to 100 mm from the left-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm. In yet other instances, processor may be configured to calculate based on the imaged opening that the boundary for a third sample collection port is from 0.1 mm to 100 mm from the left-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm.

In other embodiments, the processor may be configured to calculate based on the imaged opening that sample collection ports are each spaced apart from each other by 0.1 mm to 10 mm along a horizontal axis, such as by 0.5 mm to 9.5 mm, such as from by 1 mm to 9 mm, such as by 1.5 mm to 8.5 mm, such as by 2 mm to 8 mm, such as by 2.5 mm to 7.5 mm and including by 3 mm to 7 mm.

In still other embodiments, the process may be configured to calculate based on the imaged opening that the boundary for a first sample collection port is from 0.1 mm to 100 mm from the right-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm. In other instances, the processor may be configured to calculate based on the imaged opening that the boundary for a second sample collection port is from 0.1 mm to 100 mm from the right-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm. In yet other instances, processor may be configured to calculate based on the imaged opening that the boundary for a third sample collection port is from 0.1 mm to 100 mm from the right-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm.

In some embodiments, the system is configured to capture an image of the opening of the particle sorting module to obtain and imaged opening and convert the image of the opening into a pixelated image. The term "pixelated" is used herein in its conventional sense to mean that the captured image is composed of a multitude of regularly spaced (e.g., grid) pixels, each pixel forming a part of the captured image. In these embodiments, the processor operatively coupled to the imaging sensor may be configured to calculate a pixel location in the imaged opening of the boundaries for each of the ports at the distal end of the housing along a horizontal axis.

In some embodiments, the processor may be configured to calculate based on the imaged opening a pixel location of the boundaries for each sample collection port from the left-most edge of the image along a horizontal axis. For example, the location of the boundaries for each sample collection ports may be outputted as the number of pixels from the left-most edge of the image along a horizontal axis. In some instances, the location of the boundaries for each sample collection port may range from 1 pixel to 1000 pixels from the left-most edge of the image of the opening in the particle sorting module housing along a horizontal axis, such as from 5 pixels to 750 pixels, such as from 10 pixels to 500 pixels and including from 25 pixels to 250 pixels. In other instances, the location of the boundaries for each sample collection port is outputted as a ratio of the pixel number and total number of pixels across the imaged opening along the horizontal axis. For instances, the total number of pixels across the imaged opening may be 100 pixels and the location of each boundary for the sample collection ports may be a ratio ranging from 1/100 to 99/100, such as from 5/100 to 95/100, such as from 10/100 to 90/100, such as from 15/100 to 85/100, such as from 20/100 to 80/100 and including a ratio ranging from 25/100 to 75/100.

In certain embodiments, systems of interest include a processor having memory operably coupled to the processor where the memory includes instructions stored thereon, which when executed by the processor, cause the processor to calculate the total number of pixels across the imaged opening along the horizontal axis and multiply the total number of pixels by a predetermined ratio. In these embodiments, the boundaries (e.g., left and right boundaries along the horizontal axis) of each sample collection port is determined based on the imaged opening and assigned a pixel number and the pixel number is multiplied by a predetermined ratio. The predetermined ratio is, in certain instances, calculated by dividing the pixel number in the imaged opening of each sample collection port boundary by the total number of pixels across the imaged opening along the horizontal axis.

FIG. 1 depicts an example calculation for determining the boundaries of sample collection ports at the distal end of a particle sorting module according to certain embodiments. FIG. 1 depicts particle sorting module 100 having droplet deflector 101 that diverts the flow stream according to trajectories 101a, 101b and 101c. Particle sorting module 100 includes opening 102 for visualizing flow streams that have trajectories 101a, 101b and 101c. The flow stream is irradiated with laser 103. At the distal end of particle sorting module 100 are sample collection port 100L, 100C and 100R.

The boundaries of the first sample collection port (e.g., first deflection port) 100L is defined by $L_l$ and $L_r$; the second sample collection port (e.g., waste port) 100C is defined by $C_l$ and $C_r$; and the third sample collection port (e.g., second deflection port) 100R is defined by $R_l$ and $R_r$. In this example, the total number of pixels (P) across the opening is 100. The sample collection port boundaries ($L_l$, $L_r$, $C_l$ and $C_r$, and $R_l$ and $R_r$) are calculated as P*(pixel location/total pixels).

Where the system is configured to determine the positioning of the sample collection ports based on the imaged opening, the processor may further include memory with instructions to align the flow stream with the one or more sample collection ports. For example, the memory may include instructions to align the flow stream with the center of one of the sample collection ports based on the determined boundaries. In one instance, the system may be configured to align the flow stream with a sample collection port. In another instance, the system is configured to align the flow stream with a waste collection port. In still another instance, the system is configured to align the flow stream with the center of the distal end of the housing along a horizontal axis.

Figure 2:
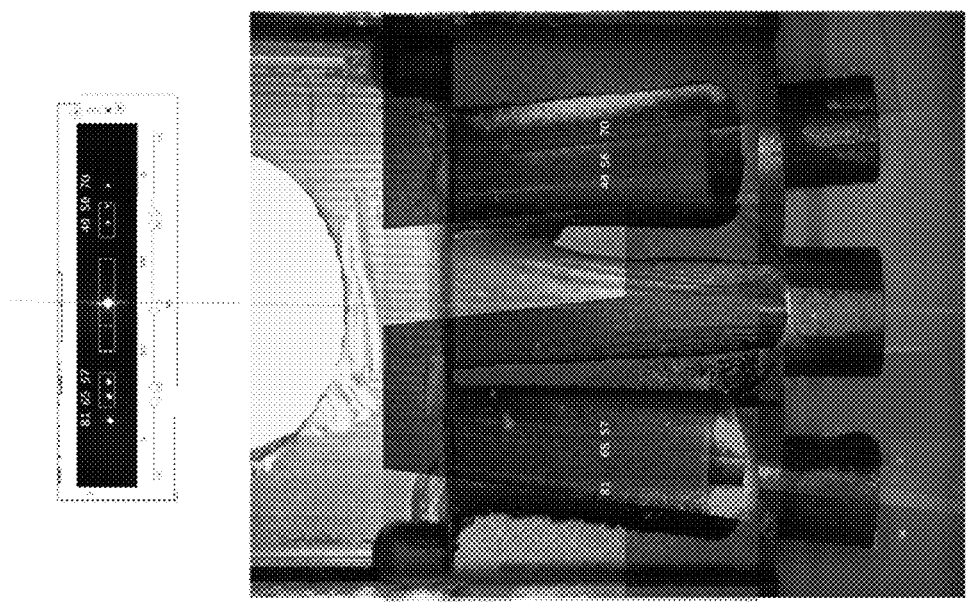
FIG. 2 depicts a particle sorting module having an opening configured for visualizing droplets of a deflected flow stream according to certain embodiments.

FIG. 2 depicts a particle sorting module having an opening configured for visualizing droplets of a deflected flow stream according to certain embodiments. As depicted in FIG. 2, the pixel locations of the boundaries of the sample collection ports as well as the trajectories of the deflected droplets of the flow stream are determined from the captured image through the opening.

Particle sorting systems according to certain embodiments also include a sample input subsystem fluidically coupled to an inlet at the proximal end of the particle sorting module. In embodiments, the sample input subsystem is configured to provide a suitable flow of sample to the flow cell nozzle chamber in the particle sorting module. Depending on the desired characteristics of the flow stream emanating from the flow nozzle, the rate of sample conveyed to the particle sorting module by the sample input subsystem may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, wherein in some instances the flow rate is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

In some embodiments, the sample fluid subsystem includes a container, a cap and one or more ports into the interior cavity of the container. The container has a distal end and a proximal end with walls between the distal end and proximal end that together form an inner cavity within the container. In some embodiments, the outer walls of the container and inner cavity have the same cross-sectional shape where cross-sectional shapes of interest include, but are not limited to curvilinear cross-sectional shapes, e.g., circles, ovals, rectilinear cross sectional shapes, e.g., squares, rectangles, trapezoids, triangles, hexagons, etc., as well as irregular shapes, e.g., a parabolic bottom portion coupled to a planar top portion. The container may be formed from any suitable material including, but not limited to, glass, metal or plastic, such as a flexible or rigid plastic, polymeric or thermoplastic materials, e.g., as described above.

The size of the inner cavity of the container may vary depending on the sample size and size of particle sorting module, where in some instances the length of the inner cavity of the container may range from 1 cm to 25 cm, such as from 2.5 cm to 22.5 cm, such as from 5 cm to 20 cm, such as from 7.5 cm to 17.5 cm and including from 10 cm to 15 cm and the width of the inner cavity of the container may range from 1 cm to 20 cm, such as from 2 cm to 17.5 cm, such as from 3 cm to 15 cm, such as from 4 cm to 12.5 cm and including from 5 cm to 10 cm. Where the inner cavity of the container has a cylindrical cross-section, the diameter may vary, in some embodiments, ranging from 1 cm to 10 cm, such as from 2 cm to 9 cm, such as from 3 cm to 8 cm and including from 4 cm to 7 cm. Accordingly, the volume of the container may vary, ranging from 1 to 500 cm$^3$, such as 5 to 250 cm$^3$, such as 10 to 200 cm$^3$, such as 15 to 150 cm$^3$, such as 20 to 125 cm$^3$ and including from 25 to 100 cm$^3$. In some embodiments, the container of the sample input module is a tube having a volume ranging from 1 mL to 500 mL, such as from 2 mL to 400 mL, such as from 3 mL to 300 mL, such as from 4 mL to 200 mL, such as from 5 mL to 150 mL and including from 10 mL to 100 mL.

In embodiments, containers of the sample input module also include a cap configured to close off the proximal end of the container. For example, the cap may be a screw cap, a snap-on cap or a cap which connects the container by a permanent, semi-permanent or non-permanent adhesive. In certain instances, the cap forms a fluidic seal with the walls of the container. The cap may be an integrated part of the container, including where the cap is molded with, soldered, welded or affixed to the container using a permanent adhesive. In other embodiments, the cap is releasably attached to the container. By "releasably" is meant that the cap can be freely detached from and re-attached to the proximal end of the container. Where the cap is releasably attached to the container, the cap may be non-permanently fastened to the container by any convenient attachment protocol, including but not limited to a hook and loop fastener, a latch, a notch, a groove, a pin, a tether, a hinge, Velcro, non-permanent adhesive, a threaded screw, or a combination thereof. In certain instances, the container includes a threaded outer wall and is screw threaded with the internal walls of the cap.

The cap may include one or more ports into the inner cavity of the container, such as 2 or more ports, such as 3 or more ports, such as 4 or more ports and including 5 or more ports. In certain embodiments, the cap includes two ports. The ports may be any convenient port configured for fluidic or gaseous communication with the inner cavity of the container. In some embodiments, the cap includes a port configured to convey gas into the container to create positive pressure within the container and to convey sample fluid from within the container through a second port to the particle sorting module. In some instances, the container includes a third opening in the cap to allow air to vent.

Any suitable port configuration may be employed depending on the desired function of the port, where examples of ports include channels, orifices, channels having a check valve, a Luer taper fitting, a port with a breakable seal (e.g., single use ports) among other types of ports. In certain embodiments, the port is configured with a Luer taper fitting, such as a Luer-Lok or a Luer-slip. Ports in the cap of the sample input module may be any suitable shape, where cross-sectional shapes of ports of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. The dimensions of the ports may vary, in some embodiments ranging from 1 mm to 100 mm, such as from 2 mm to 95 mm, such as from 3 mm to 90 mm, such as from 4 mm to 80 mm, such as from 5 mm to 70 mm, such as from 6 mm to 60 mm and including from 10 mm to 50 mm. In some embodiments, the port is a circular orifice and the diameter of the port ranges from 1 mm to 100 mm, such as from 2 mm to 90 mm, such as from 4 mm to 80 mm, such as from 5 mm to 70 mm, such as from 6 mm to 60 mm and including from 10 mm to 50 mm. Accordingly, depending on the shape of the ports, ports in the cap may have an opening which ranges from 0.01 mm$^2$ to 250 mm$^2$, such as from 0.05 mm$^2$ to 200 mm$^2$, such as from 0.1 mm$^2$ to 150 mm$^2$, such as from 0.5 mm$^2$ to 100 mm$^2$, such as from 1 mm$^2$ to 75 mm$^2$, such as from 2 mm$^2$ to 50 mm$^2$ and including from 5 mm$^2$ to 25 mm$^2$.

In some embodiments, the sample input subsystem includes one or more conduits in fluid communication with the interior cavity of the container through the one or more ports in the cap. For example, the sample input module may include 2 or more conduits, such as 3 or more conduits and including 5 or more conduits. Each conduit includes a proximal end in contact with the interior cavity of the container and a distal end having an opening for inputting or outputting gas or fluid. In some instances, the sample input subsystem includes an inlet conduit for conveying a gas into the container and an outlet conduit for conveying sample fluid from the container to the particle sorting module. In other instances, the sample input subsystem includes two inlet conduits for conveying gas into the container and one outlet conduit for conveying sample fluid from the container to the particle sorting module.

Each conduit may have a length that varies and independently, each conduit may be 5 cm or more, such as 7 cm or more, such as 10 cm or more, such as 25 cm or more, such as 30 cm or more, such as 50 cm or more, such as 75 cm or more, such as 100 cm or more, such as 250 cm or more and including 500 cm or more. The lumen diameter of each conduit may also vary and may be 0.5 mm or more, such as 0.75 mm or more, such as 1 mm or more, such as 1.5 mm or more, such as 2 mm or more, such as 5 mm or more, such as 10 mm or more, such as 25 mm or more and including 50 mm or more. For example, depending on the desired flow rate of conveying fluid from the container to the particle sorting module, the lumen diameter may range from 0.5 mm to 50 cm, such as from 1 mm to 25 mm and including from 5 mm to 15 mm.

Each conduit may be configured with one or more valves that may be opened and closed as desired. For example, each conduit may be configured with 2 or more valves, such as 3 or more valves, such as 4 or more valves and including 5 or more valves. Any convenient valve protocol may be employed, including but not limited to pinch valves, ball valves, butterfly valves, disc valves, clapper valves, check valves, ball check valves, diaphragm valves, lift check valves, tilted disc check valves, needle valves, piston valves, plug valves, poppet valves and spool valves. In certain embodiments, the inlet conduit for conveying gas into the container may be configured with two pinch valves. To maintain sterility of the sample, the inlet conduit to the container from the gas source may include a filter, such as a high-efficiency particulate arrestance (HEPA) filter or a filter having pores of 50 µm or smaller, such as 25 µm or smaller, such as 15 µm or smaller, such as 10 µm or smaller, such as 5 µm or smaller, such as 1 µm or smaller, such as 0.5 µm or smaller, such as 0.1 µm or smaller, such as 0.05 µm or smaller, such as 0.01 µm or smaller and including 0.001 µm or smaller.

In certain embodiments, systems further include one or more gas sources in gaseous communication with an inlet conduit of the sample input subsystem container. In some instances, the gas source is a pressurized gas, such as, but not limited to a pressurized gas cylinder, a compressor, and the like. In certain instances, the pressurized gas has a pressure of 2 psi or more, e.g., 5 psi or more, including 10 psi or more, e.g., 15 psi or more, including 20 psi or more, where in some instances the pressure is 25 psi or more, such as 50 psi or more, or 75 psi or more, including 100 psi or more, or 125 psi or more, for example 150 psi or more. The pressurized gas may be any convenient type of gas suitable for creating a positive pressure within the container of the sample input subsystem. For instance, the pressurized gas may include air, nitrogen, argon, and the like.

In some embodiments, the sample input subsystem includes a sample agitator. Any convenient agitation protocol may be employed including, but not limited to a sonicator, a mechanical or electrical shaker, an eccentric motion device, among other agitating protocols. In certain embodiments, the sample agitator is an eccentric motion instrument having a stepper motor and bearing (to eliminate motion) along with an off-center drive. The sample agitator may be configured to agitate the sample input module for any duration desired, such as for 1 minute or longer, such as 2 minutes or longer, such as 5 minutes or longer, such as 10 minutes or longer, such as 15 minutes or longer, such as 30 minutes or longer, such as 60 minutes or longer, such as 120 minutes or longer, such as 240 minutes or longer and including 480 minutes or longer.

The sample input subsystem may also include a temperature controller, where the temperature of the sample in the subject sample input subsystem may be maintained or changed (e.g., increased or decreased) as desired. For example, the temperature controller may be configured to maintain the temperature of the sample input subsystem from −80° C. to 100° C., such as from −75° C. to 75° C., such as from −50° C. to 50° C., such as from −25° C. to 25° C., such as from −10° C. to 10° C., and including from 0° C. to 25° C. In certain aspects, the subject systems include a temperature sensor for measuring the temperature within the sample input subsystem container and a feedback monitor configured to allow the sample input module to operate in a closed-loop fashion. For example, in some embodiments the system may assess the temperature in the sample input subsystem and the feedback monitor may adjust the temperature (e.g., increase or decrease the temperature in the sample input subsystem container on a substantially real-time basis to automatically obtain more effective results as desired.

Particle sorting systems according to certain embodiments also include a sheath fluid delivery subsystem for conveying sheath fluid to the flow cell nozzle of the particle sorting module. The term "sheath fluid" is used herein in its conventional sense to refer to fluid conveyed through a conduit (e.g., in a flow cytometer) that is used to form an annular flow coaxial with a sample-containing fluid creating a hydrodynamically focused flow of particle-containing sample fluid in the center of the sheath fluid stream. Sheath fluids of interest may be any convenient buffered composition, such as for use in a flow cytometer and may include one or more salts, including but not limited to potassium phosphate, potassium chloride, sodium phosphate, sodium chloride, preservatives as well as chelating agents, such as disodium ethylenediaminetetraacetic acid (EDTA). In embodiments, the sheath fluid dispensing system includes a fluid reservoir containing a sheath fluid, a conduit having a proximal end in fluid communication with the sheath fluid reservoir and a distal end in fluid communication with a sheath fluid input to the particle sorting module.

In some embodiments, the sheath fluid delivery subsystem includes a pressurized housing with pliant container having a reservoir for sheath fluid positioned within the housing. In other embodiments, the sheath fluid delivery subsystem includes a housing and a first pliant container and a second pliant container positioned in the housing. The first pliant container includes a fluid reservoir and a conduit having a proximal end and a distal end, where the proximal end is fluidically coupled to the fluid reservoir and the distal end is configured for coupling the conduit to the particle sorting module and the second pliant container includes a gas reservoir and a port in gaseous communication with the gas reservoir. In these embodiments, the second pliant container is positioned in the housing with the first pliant container and is configured to apply pressure to the fluid reservoir of the first pliant container to convey sheath fluid from the distal end of the conduit into the particle sorting module.

In certain embodiments, particle sorting systems of interest include a sheath fluid delivery subsystem for conveying sheath fluid to the particle sorting module, such as those described in co-pending PCT Patent Application No. PCT/US2016/048433 filed on Oct. 24, 2016 and published as WO 2017/040151; U.S. patent application Ser. No. 14/365,602 now issued as U.S. Pat. No. 9,551,643 and United States Patent Publication No. 2017/0299493, filed on Mar. 28, 2017, the disclosures of which are herein incorporated by reference in their entireties.

As summarized above, the subject systems are configured for sorting particle components of a sample, such as a biological sample. In some embodiments, systems further include a light detection system configured to irradiate and identify particle components of a sample in a flow stream, such as in a sample interrogation region of the particle sorting module (e.g., in a cuvette). In these embodiments, systems include one or more light sources for irradiating a sample in the sample interrogation region of the flow stream. The light source may be a broadband light source, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, the light source is a narrow band light source emitting a particular wavelength or a narrow range of wavelengths, such as a narrow wavelength LED, laser diode or a broadband light source coupled to one or more optical bandpass filters, diffraction gratings, monochromators or any combination thereof.

In certain embodiments, the light source is a laser. In some instances, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, $Nd:YVO_4$ laser, $Nd:YCa_4O(BO_3)_3$ laser, Nd:YCOB laser, titanium sapphire laser, thulim YAG laser, ytterbium YAG laser, ytterbium$_2$O$_3$ laser or cerium doped lasers and combinations thereof.

The light source may be positioned at an angle with respect to the flow stream which ranges from 10° to 90°, such as from 15° to 85°, such as from 20° to 80°, such as from 25° to 75° and including from 30° to 60°. In certain embodiments, the light source is positioned at a 90° angle with respect to the sample.

In these embodiments, systems of interest also include one or more detectors for detecting and measuring light from the flow stream. Detectors of interest may include, but are not limited to optical sensors or photodetectors, such as active-pixel sensors (APSs), avalanche photodiode, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the transmitted light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera. Where the fluorescent or scattered light is measured with a CCD, the active detecting surface area of the CCD may vary, such as from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$. The number of photodetectors in the subject systems may vary, as desired, such as 1 or more, such as 2 or more, such as 3 or more, such as 5 or more and including 10 or more photodetectors. Where the subject systems include more than one photodetector, each photodetector may be the same, or the collection of two or more photodetectors may be a combination of different photodetectors.

The detector may be positioned at a distance from the flow stream depending on the type of irradiating light source and characteristics of the sample (e.g., particle sizes in the sample). For example, the detector may be positioned 0.01 mm or more from the sample, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the sample. The detector may also be positioned at an angle with respect to the sample which varies. For example, the detector may be positioned at an angle with respect to the flow stream which ranges from 10° to 90°, such as from 15° to 85°, such as from 20° to 80°, such as from 25° to 75° and including from 30° to 60°. In certain embodiments, the detector is positioned at a 90° angle with respect to the flow stream. In some embodiments, systems include a detector that is positioned to detect forward scattered light from the flow stream. In other embodiments, systems include a detector that is positioned to detect side scattered light from the flow stream. In yet other embodiments, systems include a detector that is positioned to detect fluorescence from the flow stream.

Particle sorting systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Aspects of the present disclosure further include flow cytometric systems having one or more of the particle sorting modules with an opening for visualizing a deflected flow stream as described above. Suitable flow cytometry systems and methods for sorting particles in a sample include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In some embodiments, particle sorting systems of interest are configured to sort particles with an enclosed particle sorting module, such as those described in U.S. Patent Publication No. 2017/0299493, filed on Mar. 28, 2017, the disclosure of which is incorporated herein by reference. For example, particle sorting systems of interest may include a register configured for coupling with the aligners on the housing of the particle sorting module. The register may include one or more aligners that are complimentary to the aligners on the housing of the particle sorting module. In addition, the particle sorting system may include one or more fasteners for maintaining physical contact between the particle sorting module and the particle sorting system, such as by coupling one or more magnets on the particle sorting module housing with one or more magnets on the particle sorting system.

In certain embodiments, the subject particle systems are flow cytometric systems having an excitation module that uses radio-frequency multiplexed excitation to generate a plurality of frequency shifted beams of light. In these embodiments, the laser light generator may include a plurality of lasers and one or more acousto-optic components (e.g., an acoustooptic deflector, an acoustooptic frequency shifter) to generate a plurality of frequency shifted comb beams. In certain instances, the subject systems are flow cytometric systems having a laser excitation module as described in U.S. Pat. Nos. 9,423,353 and 9,784,661 and U.S. Patent Publication Nos. 2017/0133857 and 2017/0350803, the disclosures of which are herein incorporated by reference.

Methods for Aligning a Deflected Flow Stream with a Sample Collection Port

Aspects of the disclosure also include methods for aligning a flow stream with one or more sample collection ports at the distal end of a particle sorting module (as described above). Methods according to certain embodiments include capturing an image through an opening in the particle sorting module that is configured for visualizing droplets of the flow stream; calculating a pixel location in the imaged opening of the boundaries for each of the ports at the distal end along a horizontal axis; and aligning the flow stream with the ports based on the calculated pixel locations of the boundaries for each port in the imaged opening. In embodiments, the subject methods may be fully automated, such as to reduce or entirely eliminate the need for user input or manual determination of the position of the boundaries of the sample collection ports as well as the alignment of a deflected flow stream with the sample collection port. In other words, determining the position of each sample collection port boundary as well as alignment of the deflected flow stream with the sample collection ports may require little to no human intervention or manual input by the user.

In practicing methods according to certain embodiments, one or more images is captured in a detection field through an opening in the particle sorting module housing. By "detection field" is meant the field of view through the opening in the particle sorting module housing captured by the imaging sensor. The detection field imaged may vary. In some embodiments, the detection field is a predetermined length of the deflected flow stream. In other embodiments, the detection field is a predetermined portion of the opening in the particle sorting module housing. In some embodiments, the imaging sensor is configured to capture an image of the deflected flow stream emanating from droplet deflectors in a detection field. In embodiments, an image detection field may span 0.001 cm or more of the deflected flow stream, such as 0.005 cm or more, such as 0.01 cm or more, such as 0.05 cm or more, such as 0.1 cm or more, such as 0.5 cm or more, such as 1 cm or more, such as 2 cm or more, such as 5 cm or more and including 10 cm or more of the deflected flow stream.

In capturing one or more images through the opening in the particle sorting module housing, a detection field is illuminated with a light source. In some embodiments, the detection field is illuminated with a broadband light source or with a narrow band of light. Suitable broadband light source protocols may include, but are not limited to a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. Suitable narrow-band light sources, include but are not limited to lasers, a narrow wavelength LED, laser diode or a broadband light source coupled to one or more optical bandpass filters, diffraction gratings, monochromators or any combination thereof.

Capturing one or more images of through the opening in the particle sorting module housing may include illuminating with a combination of light sources, such as with two or more light sources, such as three or more light sources, such as four or more light sources and including five or more light sources. Where images are captured by illuminating with two light sources, the subject methods may include simultaneously illuminating with both light sources. In other embodiments, capturing images may include sequentially illuminating with two light sources. Where two light sources are illuminated sequentially, the time each light source illuminates may independently be 0.001 seconds or more, such as 0.01 seconds or more, such as 0.1 seconds or more, such as 1 second or more, such as 5 seconds or more, such as 10 seconds or more, such as 30 seconds or more and including 60 seconds or more. In embodiments where images are captured by sequentially illuminating with two or more light sources, the duration of illumination by each light source may be the same or different.

Images through the opening of the particle sorting module housing may be captured continuously or in discrete intervals. In some instances, methods include capturing images continuously. In other instances, methods include capturing images in discrete intervals, such as capturing an image of the flow stream every 0.001 millisecond, every 0.01 millisecond, every 0.1 millisecond, every 1 millisecond, every 10 milliseconds, every 100 milliseconds and including every 1000 milliseconds, or some other interval. One or more images may be captured in the detection field, such as 2 or more images, such as 3 or more images, such as 4 or more images, such as 5 or more images, such as 10 or more images, such as 15 or more images and including 25 or more images.

Images through the opening of the particle sorting module may be captured at any suitable distance (e.g., from the deflected flow stream) so long as a usable image is captured. For example, images may be captured through the opening in the particle sorting module housing at 0.01 mm or more from the deflected flow stream, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the deflected flow stream. Images may be captured at any angle though the opening. For example, images may captured at an angle with respect to the axis of the deflected flow stream which ranges from 10° to 90°, such as from 15° to 85°, such as from 20° to 80°, such as from 25° to 75° and including from 30° to 60°. In certain embodiments, images are captured at a 90° angle with respect to the axis of the deflected flow stream.

In some embodiments, methods include calculating based on the image a location of the boundaries for each of the sample collection ports at the distal end of the housing along a horizontal axis. In some instances, calculating the location of the boundaries includes determining the distance between the boundaries of each of the sample collection ports. For instance, methods may include calculating based on the imaged opening that the boundary for a first sample collection port is from 0.1 mm to 100 mm from the left-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm. In other instances, methods may include calculating based on the imaged opening that the boundary for a second sample collection port is from 0.1 mm to 100 mm from the left-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm. In yet other instances, methods may include calculating based on the imaged opening that the boundary for a third sample collection port is from 0.1 mm to 100 mm from the left-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm.

In other embodiments, methods include calculating the space between each of the sample collection ports (i.e., the distance between each sample collection port boundary). For example, methods may include calculating based on the imaged opening that sample collection ports are each spaced apart from each other by 0.1 mm to 10 mm along a horizontal axis, such as by 0.5 mm to 9.5 mm, such as from by 1 mm to 9 mm, such as by 1.5 mm to 8.5 mm, such as by 2 mm to 8 mm, such as by 2.5 mm to 7.5 mm and including by 3 mm to 7 mm.

In some instances, methods include calculating based on the imaged opening that the boundary for a first sample collection port is from 0.1 mm to 100 mm from the right-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm. In other instances, the methods include calculating based on the imaged opening that the boundary for a second sample collection port is from 0.1 mm to 100 mm from the right-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm. In yet other instances, methods include calculating based on the imaged opening that the boundary for a third sample collection port is from 0.1 mm to 100 mm from the right-most edge of the image along a horizontal axis, such as from 0.5 mm to 95 mm, such as from 1 mm to 90 mm, such as from 1.5 mm to 85 mm, such as from 2 mm to 80 mm, such as from 2.5 mm to 75 mm and including from 3 mm to 70 mm.

In certain embodiments, methods include generating a pixelated image. Any suitable image generating protocol may be employed where the pixelated image may be outputted, in certain instances, in a digital (e.g., editable) format. In these embodiments, methods may include calculating a pixel location in the imaged opening of the boundaries for each of the ports at the distal end along a horizontal axis. In some instances, methods include calculating based on the imaged opening a pixel location of the boundaries for each sample collection port from the left-most edge of the image along a horizontal axis. In other instances, methods include calculating based on the imaged opening a pixel location of the boundaries for each sample collection port from the right-most edge of the image along a horizontal axis. In certain instances, methods include outputting the number of pixels from one or both of the left-most edge or right-most edge of the image along a horizontal axis. For example, the location for the boundaries for each sample collection port may range from 1 pixel to 1000 pixels from the left-most edge or right-most edge of the image of the opening in the particle sorting module housing along a horizontal axis, such as from 5 pixels to 750 pixels, such as from 10 pixels to 500 pixels and including from 25 pixels to 250 pixels. In other instances, the location of the boundaries for each sample collection port is outputted as a ratio of the pixel number and total number of pixels across the imaged opening along the horizontal axis. For instances, the total number of pixels across the imaged opening may be 100 pixels and the location of each boundary for the sample collection ports may be a ratio ranging from 1/100 to 99/100, such as from 5/100 to 95/100, such as from 10/100 to 90/100, such as from 15/100 to 85/100, such as from 20/100 to 80/100 and including a ratio ranging from 25/100 to 75/100.

In some embodiments, calculating the pixel location of each boundary of the sample collection ports includes calculating the total number of pixels across the imaged opening along the horizontal axis and multiplying the total number of pixels by a predetermined ratio. In these embodiments, the boundaries (e.g., left and right boundaries along the horizontal axis) of each sample collection port is determined based on the imaged opening and assigned a pixel number and the pixel number is multiplied by a predetermined ratio.

In certain embodiments, methods include aligning the flow stream with a sample collection port based on the calculated pixel locations of the boundaries for each of the sample collection ports at the distal end of the particle sorting module housing. In some instances, one or more deflected flow streams are aligned with a sample collection port. In other instances, the non-deflected flow stream (i.e., the longitudinal axis of the flow stream) is aligned with the center of the distal end of the particle sorting module. In one example, the non-deflected flow stream may be aligned with a waste collection port at the distal end of the particle sorting module.

As described above, flow stream may be deflected by subjecting the flow stream to a deflection force with a droplet deflector. To align the deflected flow stream with a sample collection port having a location as determined above, the voltage applied to the metal plates of the droplet deflector may be adjusted as desired. The voltage applied to deflector plates to divert charged particles may be 10 mV or more, such as 25 mV or more, such as 50 mV or more, such as 100 mV or more, such as 250 mV or more, such as 500 mV or more, such as 750 mV or more, such as 1000 mV or more, such as 2500 mV or more, such as 5000 mV or more, such as 10000 V or more, such as 15000 V or more, such as 25000 V or more, such as 50000 V or more and including 100000 V or more. In certain embodiments, the voltage applied to the deflector plates is from 0.5 kV to 15 kV, such as from 1 kV to 15 kV, such as from 1.5 kV to 12.5 kV and including from 2 kV to 10 kV. As such, the electric field strength between the deflector plates ranges from 0.1 V/m to $1\times10^7$ V/m, such as from 0.5 V/m to $5\times10^6$ V/m, such as from 1 V/m to $1\times10^6$ V/m, such as from 5 V/m to $5\times10^5$ V/m, such as from 10 V/m to $1\times10^5$ V/m and including from 50 V/m to $5\times10^4$ V/m, for example $1\times10^5$ V/m to $2\times10^6$ V/m.

In some embodiments, methods include sorting components of a sample with the subject particle sorting modules. In certain instances, the sample is a biological sample and methods include sorting and collecting two or more different types of cells. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for separation from the flow stream according to a variety of parameters, such as a phenotypic characteristic identified via the attachment of a particular fluorescent label to cells of interest. In some embodiments, the system is configured to deflect analyzed droplets that are determined to include a target cell. A variety of cells may be targeted for sorting using the subject methods. Target cells of interest include, but are not limited to, stem cells, T cells, dendritic cells, B Cells, granulocytes, leukemia cells, lymphoma cells, virus cells (e.g., HIV cells) NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoetic progenitor cells (CD34+) from whole blood, bone marrow or cord blood.

Methods for sorting components of a sample according to some embodiments, include introducing a fluidic sample having target particles into the particle sorting module flow nozzle. Upon exit from the flow nozzle, the particles are passed substantially one at a time through the sample interrogation where each of the particles is irradiated by a source of light and measurements of light scatter parameters and fluorescent emissions as desired (e.g., two or more light scatter parameters and measurements of one or more fluorescent emissions) are separately recorded for each particle. The particles are passed in the flow stream substantially one at a time in a flow path through the sample interrogation region in the particle sorting module where each particle is illuminated by a light source. Depending on the properties of the flow stream being interrogated, 0.001 mm or more of the flow stream may be irradiated with light, such as 0.005 mm or more, such as 0.01 mm or more, such as 0.05 mm or more, such as 0.1 mm or more, such as 0.5 mm or more and including 1 mm or more of the flow stream may be irradiated with light. In certain embodiments, methods include irradiating a planar cross-section of the flow stream in the sample interrogation region, such as with a laser (as described above). In other embodiments, methods include irradiating a predetermined length of the flow stream in the sample interrogation region, such as corresponding to the irradiation profile of a diffuse laser beam or lamp.

In series with a sensing region, detectors, such as photomultiplier tubes (or "PMT"), are used to record light that passes through each particle (in certain cases referred to as forward light scatter), light that is reflected orthogonal to the direction of the flow of the particles through the sensing region (in some cases referred to as orthogonal or side light scatter) and fluorescent light emitted from the particles, if it is labeled with fluorescent marker(s), as the particle passes through the sensing region and is illuminated by the energy source. Each of forward light scatter (or FSC), orthogonal light scatter (SSC), and fluorescence emissions (FL1, FL2, etc.) include a separate parameter for each particle (or each "event"). Thus, for example, two, three or four parameters can be collected (and recorded) from a particle labeled with two different fluorescence markers.

As described above, suitable light detecting protocols, include but are not limited to optical sensors or photodetectors, such as active-pixel sensors (APSs), avalanche photodiode, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from the irradiated flow stream at the sample interrogation region of the particle sorting module is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, light is measured with a charge-coupled device (CCD). Where the light from the irradiated flow stream at the sample interrogation region of the particle sorting module is measured with a CCD, the active detecting surface area of the CCD may vary, such as from $0.01$ $cm^2$ to $10$ $cm^2$, such as from $0.05$ $cm^2$ to $9$ $cm^2$, such as from, such as from $0.1$ $cm^2$ to $8$ $cm^2$, such as from $0.5$ $cm^2$ to $7$ $cm^2$ and including from $1$ $cm^2$ to $5$ $cm^2$.

Methods in certain embodiment also include data acquisition, analysis and recording, such as with a computer, wherein multiple data channels record data from each detector for the light scatter and fluorescence emitted by each particle as it passes through the sample interrogation region of the particle sorting module. In these embodiments, analysis includes classifying and counting particles such that each particle is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a particle through the light source. Detection of an event that exceeds the threshold for the selected parameter triggers acquisition of light scatter and fluorescence data for the particle. Data is not acquired for particles or other components in the medium being assayed which cause a response below the threshold. The trigger parameter may be the detection of forward scattered light caused by passage of a particle through the light beam. The flow cytometer then detects and collects the light scatter and fluorescence data for the particle.

A particular subpopulation of interest is then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two-dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In certain instances, the particle sorting module is an enclosed particle sorting module having one or more aligners for coupling to the particle sorting system as described above. In these embodiments, to couple the particle sorting module to the particle sorting system, aligners on the outer wall of the particle sorting module housing are placed into contact with aligners on the register of the particle sorting system. When present, one or more fasteners may be engaged when the aligners on the outer wall of the particle sorting module housing are contacted with the aligners of the particle sorting system register to affix the particle sorting module to the particle sorting system. After coupling the particle sorting module to the particle sorting system, an amount of a fluidic sample is then injected into the particle sorting module for analysis and cell sorting as described above In certain embodiments, methods for sorting components of sample include sorting particles (e.g., cells in a biological sample) with an enclosed particle sorting module, such as described in U.S. Patent Publication No. 2017/0299493, filed on Mar. 28, 2017, the disclosure of which is incorporated herein by reference.

Kits

Aspects of the invention further include kits, where kits include one or more of the particle sorting modules as described herein. In some embodiments, kits include a particle sorting module having an opening configured for visualizing droplets of a deflected flow stream and one or more sample collection containers for coupling to the particle sorting module. In some embodiments, kits include a droplet deflector, for example a set of parallel metallic plates along with instructions for installing the droplet deflector into the particle sorting module. In some instances, kits include one or more connectors for coupling the particle sorting module to a sample fluid delivery system and a sheath fluid delivery system.

The various components of the kits may be present in separate containers, or some or all of them may be pre-combined. For example, in some instances, one or more components of the kit, e.g., each particle sorting module, sample collection container, droplet deflectors are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject, particle sorting modules, particle sorting systems, methods and computer systems find use in a variety of applications where it is desirable to analyze and sort particle components in a sample in a fluid medium, such as a biological sample. Embodiments of the present disclosure find use where it is desirable to provide a flow cytometer with improved cell sorting accuracy, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems. In certain embodiments, the subject particle sorting modules are enclosed which provide increased sterility to particle sorting systems which enhances collection of samples of greater purity as well as reduces incidences of cross-contamination between analyzed samples, such as in research and high throughput laboratory testing.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of aligning a flow stream with one or more ports at a distal end of a particle sorting module, the method comprising:
   capturing an image through an opening in the particle sorting module that is configured for visualizing droplets of the flow stream;
   calculating a pixel location in the imaged opening of the boundaries for each of the ports at the distal end along a horizontal axis; and
   aligning the flow stream with the ports based on the calculated pixel locations of the boundaries for each port in the imaged opening.

2. The method according to claim 1, wherein calculating the pixel location comprises:
   calculating the total number of pixels across the imaged opening along the horizontal axis; and
   multiplying the total number of pixels by a predetermined ratio.

3. The method according to claim 2, further comprising calculating the predetermined ratio by dividing the pixel number in the imaged opening of each port boundary by the total number of pixels across the imaged opening along the horizontal axis.

4. The method according to claim 1, wherein the particle sorting module comprises a waste collection container and two sample collection containers.

5. The method according to claim 1, further comprising irradiating the flow stream with a laser through the opening.

6. The method according to claim 1, wherein the particle sorting module comprises:
   an enclosed housing comprising a proximal end, a distal end and a wall therebetween, wherein the opening positioned in the wall of the housing; and
   a droplet deflector.

7. The method according to claim 6, wherein the opening is positioned between the droplet deflector and the distal end of the housing.

8. The method according to claim 7, wherein the opening is positioned from 0.5 cm to 5 cm from the distal end of the housing.

9. The method according to claim 7, wherein the opening is positioned from 0.5 cm to 5 cm from the droplet deflector.

10. The system according to claim 1, wherein the opening comprises an optical adjustment component.

11. The method according to claim 10, wherein the optical adjustment component comprises a focusing lens.

12. The method according to claim 10, wherein the optical adjustment component comprises a transparent optical window.

* * * * *